United States Patent
Bateman

(10) Patent No.: US 11,392,967 B2
(45) Date of Patent: **\*Jul. 19, 2022**

(54) METHOD AND SYSTEM FOR GENERATING DELIVERY ESTIMATES

(71) Applicant: Simpler Postage, Inc., San Francisco, CA (US)

(72) Inventor: Sawyer Bateman, San Francisco, CA (US)

(73) Assignee: Simpler Postage, Inc., San Francisco, CA (US)

( * ) Notice: Subject to any disclaimer, the term of this patent is extended or adjusted under 35 U.S.C. 154(b) by 1106 days.

This patent is subject to a terminal disclaimer.

(21) Appl. No.: 15/921,753

(22) Filed: Mar. 15, 2018

(65) Prior Publication Data

US 2018/0204229 A1    Jul. 19, 2018

Related U.S. Application Data

(63) Continuation of application No. 15/429,074, filed on Feb. 9, 2017, now Pat. No. 9,953,332, which is a
(Continued)

(51) Int. Cl.
*G06Q 30/02* (2012.01)
*G06Q 10/06* (2012.01)
(Continued)

(52) U.S. Cl.
CPC ....... *G06Q 30/0202* (2013.01); *G06Q 10/067* (2013.01); *G06Q 10/0833* (2013.01);
(Continued)

(58) Field of Classification Search
None
See application file for complete search history.

(56) References Cited

U.S. PATENT DOCUMENTS

| | | | |
|---|---|---|---|
| 6,772,130 B1 * | 8/2004 | Karbowski | G06Q 30/0601 705/26.1 |
| 7,483,857 B2 | 1/2009 | Bansal et al. | |

(Continued)

OTHER PUBLICATIONS

Shippo Engineering, "Webhooks, Shipping and Event Notifications", Shippo, https://goshippo.com/blog/webhooks-shipping-and-event-notifications/, retrieved Feb. 11, 2022, published Jun. 7, 2016 (Year: 2016).*

(Continued)

*Primary Examiner* — George Chen
(74) *Attorney, Agent, or Firm* — Jeffrey Schox; Diana Lin

(57) ABSTRACT

Embodiments of a method and system for determining delivery estimates for shipping a parcel include: retrieving historical delivery data from a plurality of shipping carriers; generating cross-carrier delivery features based on normalizing the historical delivery data; generating a cross-carrier delivery prediction model based on the cross-carrier delivery features; retrieving parcel data for the parcel based on a tracking number S140; generating parcel features based on normalizing the parcel data S150; determining a delivery estimate for the parcel based on processing the parcel features with the cross-carrier delivery prediction model S160; and responding to the delivery estimate S170.

16 Claims, 5 Drawing Sheets

Related U.S. Application Data continuation-in-part of application No. 14/481,078, filed on Sep. 9, 2014, now Pat. No. 10,671,966.

(60) Provisional application No. 62/340,198, filed on May 23, 2016, provisional application No. 61/879,608, filed on Sep. 18, 2013.

(51) Int. Cl.
  *G06Q 50/28* (2012.01)
  *G06Q 10/08* (2012.01)
  *G06Q 40/08* (2012.01)

(52) U.S. Cl.
  CPC ... *G06Q 10/0838* (2013.01); *G06Q 10/08345* (2013.01); *G06Q 40/08* (2013.01); *G06Q 50/28* (2013.01)

(56) References Cited

U.S. PATENT DOCUMENTS

| | | | |
|---|---|---|---|
| 7,844,553 | B2 | 11/2010 | Whitehouse |
| 8,131,654 | B2 | 3/2012 | Asano et al. |
| 8,150,781 | B2 | 4/2012 | McCall et al. |
| 8,156,052 | B1 * | 4/2012 | Lundberg ........... G06Q 30/0603 705/333 |
| 8,306,837 | B2 | 11/2012 | Eager |
| 8,311,880 | B1 | 11/2012 | Zabriskie et al. |
| 8,334,773 | B2 | 12/2012 | Cova et al. |
| 8,600,913 | B2 | 12/2013 | Williams et al. |
| 9,047,607 | B1 | 6/2015 | Curial et al. |
| 9,269,065 | B2 | 2/2016 | Erie et al. |
| 9,307,383 | B1 * | 4/2016 | Patrick ................... H04W 4/90 |
| 9,697,548 | B1 | 7/2017 | Jaff et al. |
| 10,198,707 | B1 | 2/2019 | Bolton et al. |
| 10,824,982 | B1 | 11/2020 | Whitehouse et al. |
| 2002/0107785 | A1 | 8/2002 | Melchior et al. |
| 2003/0200111 | A1 | 10/2003 | Damji |
| 2005/0251330 | A1 | 11/2005 | Waterhouse et al. |
| 2006/0041481 | A1 * | 2/2006 | Stowe ................... G06Q 10/06 705/16 |
| 2006/0224398 | A1 | 10/2006 | Lakshman et al. |
| 2008/0109246 | A1 * | 5/2008 | Russell ................. G06Q 10/04 414/800 |
| 2012/0173450 | A1 | 7/2012 | McCall et al. |
| 2013/0262274 | A1 | 10/2013 | Hariharan et al. |
| 2014/0122227 | A1 | 5/2014 | Reinshagen |
| 2014/0330741 | A1 * | 11/2014 | Bialynicka-Birula ...................... G06Q 10/0838 705/341 |
| 2015/0193857 | A1 | 7/2015 | Reed et al. |

OTHER PUBLICATIONS

Bob, "Regular Expression patterns for Tracking numbers", Stackoverflow, https://web.archive.org/web/20130415050936/https://stackoverflow.com/questions/619977/regular-expression-patterns-for-tracking-numbers, Apr. 15, 2013, retrieved Apr. 14, 2022 (Year: 2013).*

Davis, Tony, "What is a WebHook?", webhooks.pbworks.com, https://webhooks.pbworks.com/w/page/13385124/FrontPage, retrieved Mar. 28, 2017, published Jun. 5, 2011.

* cited by examiner

Tracking Detail

1111111111  Update

Delivered 

Delivered On:
Wednesday, 01/05/2011 at 9:30 A.M.

Proof of Delivery 

▼ Additional Information

| | |
|---|---|
| Cargo Ready: | 11/15/2010, 12:40 P.M. |
| Description of Goods: | COMPUTER |
| File Number: | 669699903194020 |
| Number of Pallets: | 0.0 |
| Number of Pieces: | 5.0 |
| Origin Port: | NLAMS |
| Destination Port: | BEBRU |
| Shipment Weight: | 136.0 kgs |
| Shipment Category: | House Airway Bill |
| Manifest: | 11/15/2010 12:00 A.M. |

▼ Shipping Progress

| Location | Date | Local Time | Activity |
|---|---|---|---|
| Chicago, IL, United States | 04/28/2011 | 11:46 P.M. | Documents received from shipper |
| Chicago, IL, United States | 04/28/2011 | 11:46 P.M. | Date Available to Ship |
| Amsterdam, Netherlands | 01/05/2011 | 9:30 A.M. | Delivered |
| Singapore, Singapore | 11/15/2010 | 12:40 P.M. | Received |

FIGURE 5

METHOD AND SYSTEM FOR GENERATING DELIVERY ESTIMATES

CROSS-REFERENCE TO RELATED APPLICATIONS

This application is a continuation of U.S. patent application Ser. No. 15/429,074, filed 9 Feb. 2017, which is a continuation-in-part of U.S. patent application Ser. No. 14/481,078, filed on 9 Sep. 2014, which claims the benefit of U.S. Provisional Application Ser. No. 61/879,608, filed on 18 Sep. 2013, both of which are incorporated in their entireties by this reference.

This application additionally claims the benefit of U.S. Provisional Application No. 62/340,198, filed on 23 May 2016, which is incorporated in its entirety by this reference.

TECHNICAL FIELD

This invention relates generally to the shipping services field, and more specifically to a new and useful method for generating delivery estimates based on cross-carrier aggregates.

BACKGROUND

The shipping services field is important to people and businesses across the world. Providing efficient delivery services is a challenging task with many facets. While the shipping services field has grown and matured over the years, delivery and shipping inefficiencies still cause substantial problems for shipping senders, shipping recipients, and shipping carriers alike. In particular, it can be difficult for shipping senders and/or recipients to accurately estimate transit time (and thus delivery time) for a given shipment. Thus, there is a need in the field of shipping services to create a new and useful method for generating delivery predictions based on cross-carrier aggregates. This invention provides such a new and useful method.

BRIEF DESCRIPTION OF THE FIGURES

FIG. 5 is an example representation of parcel tracking data in a variation of an embodiment of a method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview.

Figure 1:
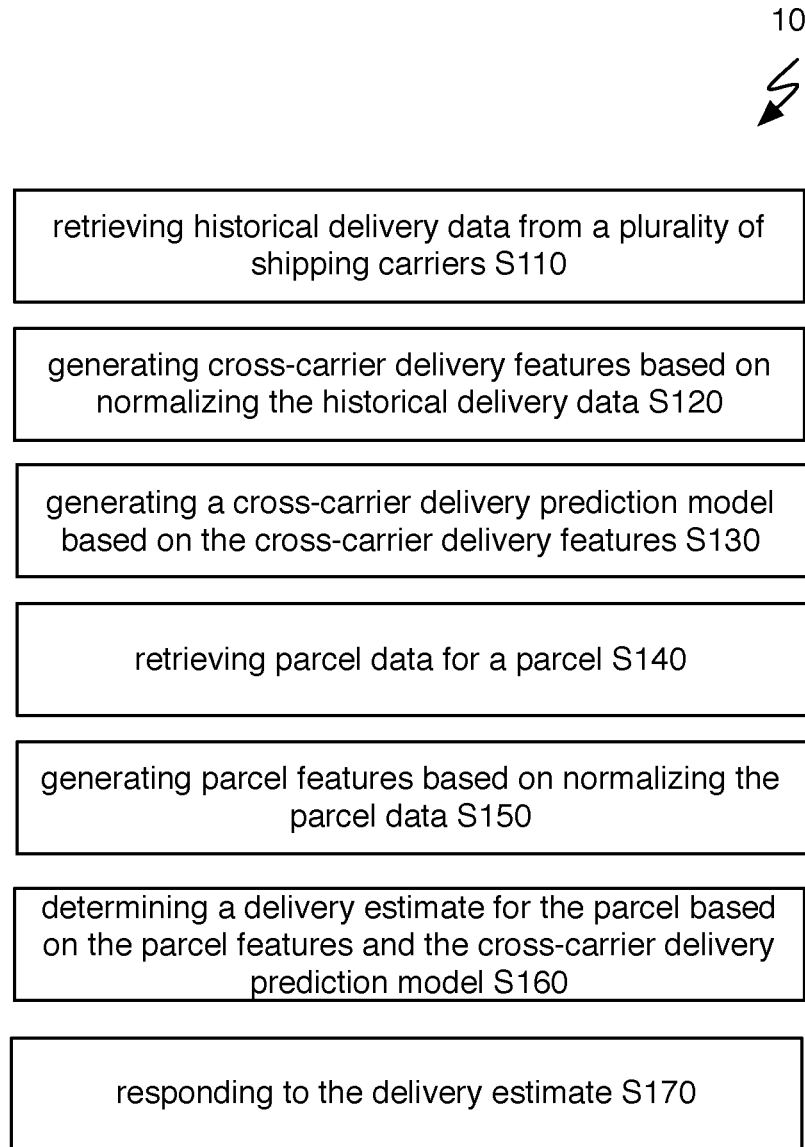
FIG. 1 is a chart representation of a variation of an embodiment of a method.
Figure 2:
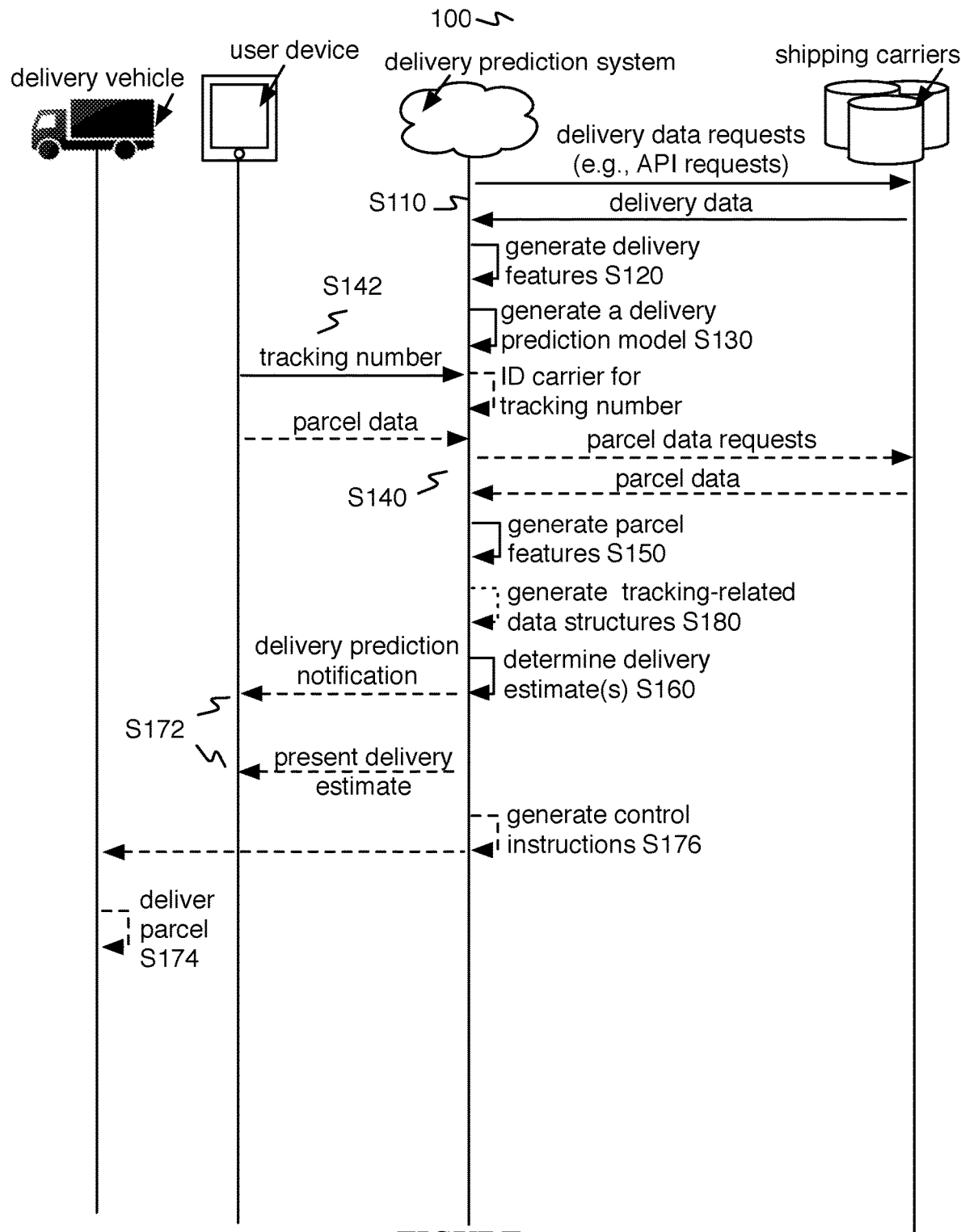
FIG. 2 is a chart representation of variations of an embodiment of a method.

As shown in FIGS. 1 and 2, an embodiment of a method for predicting transit time for a parcel associated with a user includes: retrieving historical delivery data (e.g., past delivery data) from a plurality of shipping carriers S110; generating cross-carrier delivery features based on normalizing (e.g., standardizing) the historical delivery data across the plurality of shipping carriers S120; generating a cross-carrier delivery prediction model based on the cross-carrier delivery features S130; retrieving parcel data for the parcel based on a tracking number S140; generating parcel features based on normalizing the parcel data S150; determining a delivery estimate for the parcel based on processing the parcel features with the cross-carrier delivery prediction model S160; and responding to the delivery estimate S170, which can additionally or alternatively include notifying a user with a delivery prediction notification S172, delivering the parcel based on the delivery estimate S174, and/or generating an automated system command S176, and/or any other suitable operations. The method 100 can additionally or alternatively include generating tracking-related data structures S180.

The method 100 and/or system 200 function to use parcel data (e.g., tracking data collected in S140) in combination with historic delivery data across multiple carriers (e.g., collected in S110) to provide delivery predictions of greater accuracy and/or suitability (e.g., tailored to user preferences) than those offered to customers by third party shipping carriers and/or those available internally at the third party shipping carriers. The method and/or system 200 can additionally or alternatively function to provide tracking information with increased efficiency and/or significant reductions in costs. Additionally or alternatively, the method 100 and/or system 200 can function to determine delivery estimates for different service levels (e.g., Next Day Air, Ground Transportation, etc.) provided by a shipping carrier, to automatically select and/or enable a user to select a preferable service level based on the delivery estimates. However, the method 100 can include any suitable functionality.

The method 100 is preferably implemented by one or more elements of the system 200, but can additionally or alternatively be implemented by a shipping services platform and/or other systems (e.g., shipping automation system), such as those described in U.S. patent application Ser. No. 14/481,078, filed 9 Sep. 2014, and U.S. patent application Ser. No. 15/429,039, filed 9 Feb. 2017, the entireties of which are incorporated by this reference. However, the method 100 can be implemented by any suitable system.

2. Benefits.

The method 100 and system 200 can provide several benefits over traditional approaches to determining delivery estimate times for shipments. First, the technology can automatically retrieve and/or generate multiple types of delivery-related data (e.g., cross-carrier data such as historical delivery data for completed shipments across a plurality of carriers; parcel-specific data such as weight and selected service level; tracking data provided by a shipping carrier; contextual data such as weather data; etc.) in order to improve upon the accuracy and efficiency of delivery estimation.

Second, the technology can include an approach necessarily rooted in computer technology for overcoming a problem specifically arising in the realm of computer networks. In an example, the technology can automatically communicate with digital platforms of a plurality of shipping carriers (e.g., by generating API requests tailored to each different platform) to retrieve delivery data and/or parcel data to update delivery estimate predictions and/or delivery prediction models in real-time, thereby overcoming a technical problem of obtaining and leveraging delivery estimate-related data originating from a plurality of different digital platforms, shipping carriers, and locations.

Third, the technology can confer improvements to the functioning of computer-related technology. In an example, the technology can amount to an inventive distribution of functionality across a network of one or more: shipping carriers (e.g., with API and/or other digital platforms facilitating retrieval of delivery data and/or parcel data), delivery prediction systems (e.g., acting as a central hub of communication for retrieving delivery-related data from a plurality of sources to use in generating and/or executing delivery prediction models), delivery vehicles (e.g., which can be routed, re-routed, and/or otherwise controlled based on improved delivery estimates), users (e.g., shipping senders, shipping recipients, and/or other users who can leverage an API of a first part shipping services platform to utilize the delivery prediction system), and/or other suitable entities. In another example, the technology can apply computer-implemented rules (e.g., feature engineering rules for processing delivery data into an operable form for generating features indicative of delivery time; user preference rules for determining format of delivery estimates; delivery estimate response rules for appropriately responding to a given delivery estimate; etc.) in conferring improvements to the computer-related technical field of predicting delivery estimates. In another example, the technology can improve the functioning of shipping logistics systems (e.g., freight logistics, supply chain management systems) by improving upon accuracy and efficiency of predicting delivery estimates, thereby improving the accuracy of shipping logistics systems in appropriately responding to the delivery estimates (e.g., a distribution center that is able to more accurately schedule redistribution to retailers based on improved delivery estimates for products being received by the distribution center). In another example, the technology can improve automated computing systems that rely on updated delivery information (e.g., factory inventory systems linked to production), where improved delivery estimates can lead to lower variance in operational conditions for decreasing computation time and resources required to allocate delivered physical resources.

Fourth, the technology can transform a particular article to another state or thing. For example, the technology can transform one or more of: a user device (e.g., activating an application executing on a smart phone by pushing a event occurrence to a webhook endpoint integrated with the application, etc.), a delivery vehicle (e.g., automatically delivering a parcel with the delivery vehicle according to a service level selected based on a delivery estimates; routing and/or re-routing the delivery vehicle based on delivery estimates), automated computing systems relying on updated delivery estimates (e.g., distribution center systems, retail systems, etc.), and/or other suitable systems. However, the technology can provide any other suitable benefits in the context of using non-generalized systems for determining delivery estimates.

3.1 Method—Retrieving Delivery Data.

Block S110 recites: retrieving historical delivery data from a plurality of shipping carriers. Block S110 functions to collect past data informative of deliveries administered by shipping carriers (e.g., data linked generally to delivery of objects, rather than data linked specifically to the parcel for delivery predictions are desired).

Regarding Block S110, retrieving delivery data preferably includes retrieving cross-carrier delivery data (e.g., historical delivery records originating and/or associated with a plurality of shipping carriers, such as both USPS and UPS), but can alternatively include retrieving delivery data from a single carrier and/or other suitable entity. Delivery data preferably includes any one or more of: address data (e.g., origin address, destination address, intermediary addresses, etc.), handling times, transit times (e.g., overall transit time, transit time from a first location to a second location, etc.), delivery route data (e.g., indicative of the route traveled by the delivery vehicle, etc.), status change data (e.g., timestamps associated with a status change, types of status changes including pre-transit, in transit, out for delivery, available for pickup, delivered, returned to sender, failure, cancelled, error, etc.), carrier-provided delivery estimates (e.g., delivery scheduled for January 6, etc.), confirmed delivery data (e.g., in transit on January 4, actual delivery date of January 7, etc.), service level (e.g., UPS Next Day Air, etc.), and/or any other suitable tracking data, etc.

In examples, address data can include number of successful deliveries to a particular address, additional information about the address (e.g., instructions for package deliverers), information upon which carriers verify an, and/or any other suitable information related to addresses. In examples, delivery route data can include the probable route taken by delivery drivers of a particular carrier to deliver items to particular areas or addresses, the times of day that deliveries (or pickups) occur, how long delivery from a shipping center and/or location to a particular area and/or address takes, typical traffic patterns along a route, real-time traffic data along a route, and/or any other suitable information related to delivery routes. In examples, confirmed delivery data can include confirmed pickup data, actual delivery dates, effect on parcels delivery time from confirmed delivery data regarding other parcels (e.g., if a shipping carrier maintains data on confirmed delivery windows or confirmed pickup windows for a particular carrier, the data can be indicative of probable package delivery times for packages on routes affected by those confirmed delivery windows or pickup windows).

In a specific example, if a scheduled pickup is to occur at a first address between 1:00 PM and 1:15 PM along a known shipping route, this can increase the probability that packages will be delivered to nearby addresses along the same route around this time. Additionally or alternatively, delivery data can include contextual data (e.g., about an area such as a origin, destination, and/or intermediate area) such as demographics of an area (e.g., population, per capita income), weather data (e.g., weather during a given day or season, weather patterns, etc.), theft statistics, area traffic patterns, and/or any other contextual data.

Delivery data can additionally or alternatively include any other data relevant to shipping, including any one or more of delivery vehicle data (e.g., delivery vehicle types, driver analytics such as driver behavior, delivery vehicle analytics, fleet analytics, delivery vehicle sensor data such as radar sensor data and image datasets from optical sensors, locations of available delivery vehicles, the number of delivery trucks in operation at a given time or summed over a given time interval, etc.), temporal-related data (e.g., the number of packages being delivered in a given time interval or other indication of delivery volume, changes in delivery data depending on date and/or time, etc.), and/or any other suitable data.

Regarding Block S110, delivery data can be historical, real-time (e.g., the number of delivery vehicles on the road in a given area last Thursday vs. right now), and/or have any suitable temporal association. Delivery data can be represented with any suitable types of units. Further, the types of delivery data can vary across different shipping carriers. Delivery data can be public or proprietary (e.g., private information not generally available to the public), where retrieving delivery data can include authenticating data requests to delivery data source, such as with a cryptographic key (e.g., API key) or signature. However, delivery data can associated with any suitable permissions.

Block S110 can include receiving and/or querying for delivery data in a push and/or pull framework for data collection. Retrieving delivery data preferably includes generating and transmitting data requests for each of the plurality of shipping carriers (e.g., databases of third party shipping carriers, of first party shipping carriers, etc.). The data requests are preferably API requests to APIs associated with platforms of the shipping carriers, but can additionally or alternatively be in a form suited for retrieving delivery data and/or other related data from one or more of: non-shipping carrier platforms (e.g., manufacturer databases, distribution center databases, sharing economy platforms such as ride-sharing platforms, map platforms, etc.), Internet resources (e.g., scraping shipping carrier websites and/or other websites for delivery data, etc.), and/or any other suitable entity.

In a variation, Block S110 can include transforming a data request based on carrier-specific rules (e.g., carrier API request rules such as data limit restriction rules, request format rules, etc.). In an example, Block S110 can include generating a plurality of API requests, each API request tailored to a different carrier from the plurality of carriers based on a set of carrier API request rules; and receiving updated delivery data (e.g., to use in generating and updating a cross-carrier delivery prediction model in Block S130) from the plurality of carriers through the API requests. Data requests associated with any number of users, trackers, shipping carriers, shipments and/or other entities can be batched into any number of requests (e.g., a single API request to a shipping carrier for retrieving delivery data across a plurality of service levels provided by the shipping carriers). Aggregating requests for different types of information can improve computational processing efficiency and/or network functionality such as in a network including a delivery prediction system, a plurality of shipping carriers, and a plurality of users. Additionally or alternatively, data requests can be generated and/or processed with any suitable computer-implemented rules.

In another variation, Block S110 can include establishing webhooks for automatically receiving delivery data. A webhook preferably enables an entity (e.g., a first party shipping platform; a user; etc.) to be automatically updated in response to an event occurrence (e.g., a shipping carrier updating their database with updated delivery data; a delivery prediction system generating an updated delivery estimate; etc.). A webhook preferably includes a webhook origin (e.g., from which an event occurrence notification is transmitted) and a webhook endpoint (e.g., to which the event occurrence is transmitted), but can include any suitable framework components. Additionally or alternatively, webhooks (e.g., endpoints, operations for processing data received through webhooks, etc.) can be established for automatically receiving and/or transmitting parcel data (e.g., in Block S140), and/or any other suitable data from any suitable entity (e.g., non-shipping carrier platforms). In an example, Block S110 can include establishing one or more webhook endpoint Uniform Resource Locators (URLs) for receiving communication from one or more carriers; and receiving data (e.g., delivery data, parcel data, etc.) through one or more Hypertext Transfer Protocol (HTTP) POST requests at the one or more webhook endpoint URLs in response to one or more event occurrences (e.g., a first carrier updating a delivery status change associated with the first tracking number). Additionally or alternatively, configuring a webhook can be performed in any suitable manner.

Block S110 can be performed at predetermined time intervals (e.g., updating the delivery data on a weekly basis based on sending new queries to the shipping carriers every week, etc.), in response to and/or concurrently with a trigger event (e.g., the delivery data source updating delivery data; a user requesting a delivery estimate; generating and/or executing a delivery prediction model; predicting a delivery estimate with a low confidence level; receiving a tracking number, etc.) and/or at any suitable frequency or time in any suitable temporal relationship to other portions of the method 100. In a variation, Block S110 is performed at different frequencies for different shipping carriers. For example, Block S110 can include querying a first shipping carrier at a first time interval (e.g., weekly) based on data limit requirements (e.g., data amount restrictions, data type restrictions, etc.) for the first shipping carrier API; and querying a second shipping carrier at a second time interval based on data limit requirements for the second shipping carrier API. Block S110 can additionally or alternatively be performed in any manner analogous to that described in U.S. patent application Ser. No. 14/481,078, filed 9 Sep. 2014, and U.S. patent application Ser. No. 15/429,039, filed 9 Feb. 2017, the entireties of which are incorporated by this reference.

In another variation, Block S110 can include retrieving current delivery data to be used in generating delivery features to be used as inputs into an already-generated delivery prediction model (e.g., along with parcel features, etc.). For example, the method 100 can include: retrieving parcel data based on a tracking number for a current delivery; determining a probable route from the origin address to the destination address specified in the parcel data; retrieving current delivery data (e.g., contextual data) associated with the probable route; and determining a delivery estimate based on the current delivery data (e.g., along with the parcel data). As such, Block S110 can be performed in association with generation and/or execution of a delivery prediction model. Additionally or alternatively, Block S110 can be performed at any suitable time and/or in any suitable manner.

3.2 Method—Generating Delivery Features.

Block S120 recites: generating cross-carrier delivery features based on normalizing the historical delivery data across the plurality of shipping carriers. Block S120 functions to normalize (e.g., standardize, filter, convert, otherwise process, etc.) the delivery data into a form suitable for use in generating a delivery prediction model (e.g., in Block S130). Block S120 preferably includes generating cross-carrier delivery features (e.g., features generated from delivery data spanning across a plurality of shipping carriers), but can include generating any suitable delivery features including any one or more of: address features, delivery route features, contextual features (e.g., weather features, demographic features, etc.). Delivery features preferably include conditioned delivery data (e.g., normalized delivery data), but can include raw delivery data (e.g., without post-processing after retrieval of the delivery data) and/or any other suitable data.

Regarding Block S120, determining delivery features is preferably based on processing delivery data according to one or more computer-implemented rules (e.g., a feature engineering rule, a user preference rule, etc.), but delivery features can be determined based on any suitable information. Block S120 preferably includes applying computer-implemented rules to process cross-carrier delivery data, but can additionally or alternatively include applying computer-implemented rules to process delivery data on a parcel-specific basis (e.g., generating features for packages above certain dimensions in a different manner than for packages below certain dimensions, where delivery features useful for tracking letter size packages may not be useful for tracking oversized and/or heavy packages, etc.), a shipping carrier-specific basis (e.g., generating features specific to UPS or USPS, etc.), a service level-specific basis (e.g., selecting a set of feature types tailored to UPS 2nd Day Air deliveries, etc.), a user-specific basis (e.g., selecting a set of feature types tailored to deliveries from a particular company, etc.), and/or on any suitable basis.

In a variation, Block S120 includes applying a feature engineering rule to select, filter, and/or otherwise generate features based on delivery data. In an example, the feature engineering rule can be a unit standardization rule, which can standardize a given type of delivery data that can vary in format across shipping carriers (e.g., a first shipping carrier providing parcel weight in pounds and a second shipping carrier providing parcel weight in ounces, etc.) for enabling meaningful comparisons between the delivery data (e.g., by converting all parcel weight data to ounces). In a specific example, Block S120 can include applying the unit standardization rule for converting historic carrier-provided delivery estimates across a plurality of shipping carriers (e.g., a first delivery estimate specifying both day and time from a first shipping carrier, a second delivery estimate only specifying day from a second shipping carrier) into a standardized unit type (e.g., total estimated number of transit days). In another specific example, Block S120 can include applying natural language processing to parse descriptions of service levels used in historical deliveries (e.g., converting service level descriptions into a corresponding mode of transportation such as automobile vs. aircraft; into an advertised delivery time such as next business day for Next Day Air; etc.). In another example, applying the feature engineering rule can include combining cross-carrier delivery data. In a specific example, Block S120 can include processing historical delivery records across shipping carriers to determine a median time to delivery for packages traveling from one location (e.g., a broad region, a zip code, a particular address) to another location (e.g., a distribution center). In other specific examples, Block S120 can include computing mean times to delivery, variances in time to delivery (e.g., across deliveries, across shipping carriers, across service, between carrier-provided delivery estimates and actual delivery dates, frequency of status changes such as changes in delivery estimates over the course of the delivery, etc.), and/or other suitable delivery time parameters. However, transforming cross-carrier delivery data into delivery features can be performed in any suitable manner (e.g., analyzing typical drop-off times across shipping carriers to generate a probably parcel pickup time feature). In another example, applying a feature engineering rule can include applying a feature selection rule (e.g., feature selection algorithms such as exhaustive, best first, simulated annealing, greedy forward, greedy backward, and/or other suitable feature selection algorithms) to filter, rank, and/or otherwise select features for use in generating one or more delivery prediction models (e.g., in Block S130). Choice of feature selection rules can be based on shipping carrier, purpose of the delivery prediction model (e.g., efficiency, accuracy, and/or other suitable criteria, which can be determined based on user preferences, etc.), delivery data, and/or any other suitable criteria. However, applying feature engineering rules can be performed in any suitable manner.

In another variation, Block S120 can include applying a user preference rule. For example, Block S120 can include generating different sets of features for models to be used for different types of users. In a specific example, Block S120 can include generating a first set of features (e.g., including a greater number of feature types selected for optimizing delivery estimate accuracy) for a first delivery prediction model to be used for enterprise users; and generating a second set of features (e.g., including a smaller number of feature types selected for optimizing prediction speed) for a second delivery prediction model to be used with non-enterprise consumers. However, applying a user preference rule can be performed in any suitable manner.

Block S120 can be performed at predetermined time intervals, in response to and/or concurrently with a trigger event (e.g., receiving delivery data in Block S110, generating a delivery prediction model in Block S130, etc.), and/or at any suitable frequency or time in any suitable temporal relationship to other portions of the method 100. In an example, the trigger event can include reaching a delivery data threshold (e.g., receiving an amount of data and/or types of data exceeding a threshold). However, Block S120 can be performed in any suitable manner.

3.3 Method—Generating a Delivery Prediction Model.

Block S130 recites: generating a cross-carrier delivery prediction model based on the cross-carrier delivery features. Block S130 functions to generate and/or store one or more delivery prediction models for predicting delivery estimates. Generating the delivery prediction model is preferably based on using delivery features (e.g., generated in Block S120), but can additionally or alternatively use any other suitable features. For example the method 100 can include: generating parcel features (e.g., in Block S150) based on parcel data (e.g., retrieved through a tracking number) for a parcel mid-delivery; and generating and/or updating a delivery prediction model based on the parcel features (and/or delivery features), where the delivery prediction model can leverage real-time (e.g., mid-delivery) parcel data for generating and/or adjusting delivery estimates. The delivery prediction model preferably outputs a delivery estimate (e.g., delivery day, time, time window, amount of time until delivery, etc.), but can additionally or alternatively output delivery-related data including one or more of: confidence levels for the delivery estimate, predictions that the parcel will be delivered with other parcels, predictions that parcels will be shipped along a particular delivery route, predictions that parcels will be delivered by a specific delivery vehicle and/or delivery agent, predictions that parcels will encounter particular shipping exceptions, predictions of time spent in various locations such as carrier transit facilities, and/or any other suitable data.

Regarding Block S130, a delivery prediction model can include any one or more of: probabilistic properties, heuristic properties, deterministic properties, and/or any other suitable properties. In a variation, Block S130 can include assigning one or more weights to delivery features used in generating a delivery prediction model, where a weight preferably impacts the proportion of influence that a corresponding feature will have in determining a delivery estimate. Weight values are preferably determined based on correlation between the corresponding feature and delivery time, but can additionally or alternatively be determined based on any suitable criteria. In an example, Block S130 can include assigning a greater weight to a carrier-provided delivery estimate feature, and smaller weights to contextual features. However, assigning weights to delivery features for generating delivery prediction models can be performed in any suitable manner.

In another variation, Block S130 includes training a delivery prediction machine learning model. In a specific example, a training sample can correspond to a single delivery by a shipping carrier. The training sample can include delivery features (e.g., vectorized; generated in Block S120, etc.) and a corresponding label (e.g., actual delivery time for the delivery, which can be directly obtained from the raw delivery data and/or through processing of the raw delivery data such as calculating the amount of minutes between timestamps for an "Out for Delivery" status change and a "Delivered" status change, etc.). In examples, Block S130 and/or other portions of the method 100 can employ machine learning approaches including any one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Additionally or alternatively, Block S130 and/or other portions of the method 100 can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and/or any suitable form of machine learning algorithm. In a specific example, Block S130 can include training a neural network model, where delivery features are used as inputs for the input neural layer of the neural network model. However, generating a delivery prediction machine learning model can be performed in any suitable manner.

In another variation, Block S130 can include generating a decision tree model with internal nodes and branches selected based on correlations between delivery data and delivery time. In a specific example, a decision tree model can start with a carrier-provided delivery estimate, and subsequently adjust the delivery estimate based on potential delivery-related outcomes (e.g., rainy weather vs. sunny weather; heavy vs. light traffic) and corresponding probabilities (e.g., determined from historic weather data; determined from historic traffic data, etc.). However, generating a decision tree model can be performed in any suitable manner.

In another variation of Block S130, different delivery prediction models (e.g., generated with different algorithms, with different sets of features, etc.) can be generated (and/or selected, retrieved, and/or executed as in Block S160) based on one or more of: delivery route data (e.g., different models for intra-state versus inter-state deliveries, different models based on exceeding or being below a transit distance threshold such as 500 miles, etc.), service levels (e.g., First Class vs. Priority), shipping carrier, parcel data (e.g., hazardous vs. non-hazardous objects to be shipped, weight, dimensions, batch vs. non-batch shipment, etc.), type of delivery vehicle (e.g., automobile, railway vehicle, aircraft, watercraft, combination of delivery vehicle types, autonomous vehicle, manually operated vehicle, etc.), user aspects (e.g., based on user preferences, based on type of user such as enterprise vs. consumer, etc.), and/or any other suitable criteria. However, any suitable number and/or type of delivery prediction models can be generated. Regarding Block S130, generating and/or updating one or more delivery prediction models can be performed at predetermined time intervals, in response to and/or concurrently with trigger events (e.g., receiving a threshold amount of delivery data, generating delivery features, receiving a user request for a delivery estimate, etc.), and/or at any suitable time and/or frequency. However, generating a delivery prediction model can be performed in any suitable manner.

3.4 Method—Retrieving Parcel Data.

Block S140 recites: retrieving parcel data for a parcel based on a tracking number. Block S140 functions to retrieve data concerning a parcel (e.g., a parcel scheduled to be delivered, in mid-delivery, etc.) and/or batch of parcels. The parcel data can be used in generating delivery estimates (e.g., in Block S160), such as in light of historical and/or real-time delivery data (e.g., collected in S110), and/or for any other suitable purpose (e.g., identifying an appropriate service level for shipping the parcel). Block S140 can additionally or alternatively include receiving a tracking number S142.

Regarding Block S140, parcel data preferably includes any data concerning the shipping of a particular parcel, such as one or more of: origin address, destination address, parcel size (e.g., dimensions, volume, surface area, etc.), parcel weight (e.g., object weight, overall package weight), delivery route data (e.g., current route, other potential routes, associated contextual data such as traffic along a given route), current location (e.g., where a package resides along a delivery route), temporal data (e.g., shipping date, current data, etc.), service level (e.g., Drone Delivery Service vs. Ground), status changes (e.g., a list of status descriptions and/or associated locations, dates, and times such as "Available to ship; San Francisco, Calif.; March 5; 2:30 pm"), delivery estimates (e.g., estimated delivery date, estimated delivery time, estimated handling time, etc.), image data (e.g., images of the parcel, images of the objects within the packaging container, etc.), delivery vehicle data (e.g., delivery vehicle type, driver analytics such as driver behavior for the individual controlling the delivery vehicle, delivery vehicle sensor data such as image datasets captured from optical sensors of the delivery vehicle, etc.), identifiers (e.g., originating sender's account number), data types analogous to types of delivery data (e.g., in Block S110), and/or any other suitable data. An example of parcel data can is shown in FIG. 5, but parcel data can be configured in any suitable manner.

In relation to Block S140, retrieving parcel data is preferably based on processing a tracking number (e.g., received in Block S142) but can be based on any suitable information (e.g., delivery data, a different parcel identifier, shipping sender data, shipping recipient data, a non-shipping carrier platform, etc.). The tracking number is preferably associated with the shipping carrier that is shipping the parcel referred to by the tracking number, but can additionally or alternatively be associated with any suitable entity (e.g., a user, a service level, etc.). The tracking number can include alphanumeric characters, be unique (e.g., globally unique), non-unique (e.g., where a shipping carrier reuses tracking numbers, where multiple shipping carriers can use the same tracking number, etc.), secured (e.g., encrypted, etc.), and/or be any suitable form. A tracking number is preferably received with a corresponding shipping carrier identifier identifying the shipping carrier shipping the parcel tracked by the tracking number, but can alternatively be received without an associated shipping carrier identifier (e.g., when a user transmits a tracking number but not an associated shipping carrier identifier through an API; when the tracking number is associated with tracking data from a shipping service platform distinct from the shipping carrier; etc.). In such cases, Block S140 can include automatically identifying the shipping carrier associated with a given tracking number, such as by analyzing and/or processing the tracking number (e.g., determining an alphanumeric pattern; pattern matching the alphanumeric pattern to patterns used by different shipping carriers; parsing the tracking number for characters indicative of shipping carrier; parsing the tracking number into features and executing a machine learning algorithm with the features; etc.). In an example, Block S140 can include automatically identifying a carrier (e.g., a first carrier, a second carrier) as associated with the a tracking number (e.g., a first tracking number, a second tracking number) based on analyzing the tracking number; and generating an API request (e.g., for parcel data) tailored to the identified carrier in response to automatically identifying the carrier. In another example, Block S140 includes transmitting a plurality of parcel data requests with the tracking number to different shipping carriers; and identifying the shipping carrier based on which shipping carrier responded to the request with parcel data for the tracking number.

Block S140 preferably includes requesting parcel data through a shipping carrier API and/or other digital platform enabling requests for parcel data, but can additionally or alternatively include requesting for parcel data in any suitable manner. For example, Block S140 can include generating and transmitting an API request including a tracking number to a shipping carrier, and parsing the response by the shipping carrier. In another example, Block S140 can include submitting the tracking number via a webform and scraping the resulting website generated after submission of the webform (e.g., the tracking page).

Block S140 can be performed in a predetermined time interval (e.g., every hour), in response to and/or concurrently with a trigger event (e.g., receiving a user request for a delivery estimate, receiving a tracking number, generating a tracking data structure, generation and/or updating of a delivery prediction model, receiving a notification from a shipping carrier, etc.), and/or at any suitable time and/or frequency. The frequency and/or timing of retrieving parcel data can vary based on shipping carrier rules (e.g., data limit rules) and/or any other suitable criteria. In a variation, Block S140 can be scheduled in response to previously retrieved parcel data (e.g., also in Block S140), where the output of Block S140 (e.g., parcel data) can be used as an input for determining when to perform Block S140. For example, if Block S140 collects tracking data suggesting a parcel will be delivered in a week, Block S140 can be performed only once a day until the expected delivery time is within forty-eight hours. Likewise, if Block S140 collects data inconsistent with predicted data (e.g., it can be predicted that a parcel passes through a particular distribution center at a particular time, but the actual tracking data shows the parcel passing through a different distribution center), this can result in modification of when and how data requests are performed via Block S140, where data retrieved at different times from the data requests can subsequently be processed (e.g., into delivery features) and used for generating updated delivery prediction models and/or executing a delivery prediction model with new inputs. In a specific example, Block S140 can include: querying shipping carriers for parcel data according to a default query schedule; receiving unexpected parcel data (e.g., frequent changes in delivery estimates; arrival at an unexpected distribution center; current location differing from expected location beyond a distance threshold; contextual data such as weather data and/or traffic data causing re-routing of the delivery vehicle; etc.); and modifying the query schedule based on the unexpected parcel data (e.g., increasing frequency of performing Block S140 for retrieving parcel data, in order to more frequently gather parcel data for identifying and resolving tracking issues, etc.). In another variation, Block S140 can be performed based on delivery data (e.g., received in Block 110). For example, a disruption to a shipping carrier can be detected via processing of delivery data received in S110; and Block S140 can include querying shipping carriers with tracking numbers to determine if the disruption has been reflected in changes to current parcel data presented by the shipping carriers. However, Block S140 can be performed with any suitable relation to other portions of the method 100. In another variation, Block S140 can include receiving parcel data at a webhook endpoint established with a shipping carrier (e.g., in response to an event occurrence such as a status change and/or other update in tracking data), but Block S140 can use webhooks in any suitable manner. However, Block S140 can be performed in any suitable manner.

Block S140 can additionally or alternatively include receiving a tracking number S142. Block S142 functions to receive a tracking number and/or other identifier for a parcel and/or batch of parcels. The tracking number is preferably generated by a shipping carrier, but can additionally or alternatively be generated by a shipping services platform. For example, a user of a shipping services platform can be provided with a proprietary tracking number used by the shipping services platform (e.g., distinct from the tracking number or number generated by shipping carriers). Additionally or alternatively, the shipping services platform and shipping carrier(s) can cooperatively generate a tracking number (e.g., linked to information in both the shipping services platform and at the shipping carrier). Block S142 can additionally or alternatively include receiving any user-submitted (e.g., as opposed to carrier-derived) information about a parcel and/or about shipping information related to a parcel. Block S142 preferably includes receiving the tracking number via an application programming interface (API) from a user (e.g., shipping sender, shipping recipient, etc.), shipping carrier, and/or any other suitable entity. The API is preferably implemented using RESTful JSON but can alternatively be implemented in any other suitable manner. Additionally or alternatively, Block S142 can include receiving the tracking number through a text submission from a website or native application; through an image of a shipping label and scanning the label (e.g., label text, label barcode, label images) to identify a tracking number (e.g., via a barcode scanning application, via OCR); and/or through any suitable means. However, receiving a tracking number S142 can be performed in any suitable manner.

3.5 Method—Generating Parcel Features.

Block S150 recites: generating parcel features based on normalizing the parcel data. Block S150 functions to normalize (e.g., standardize, filter, convert, otherwise process, etc.) the parcel data into a form suitable for input into a delivery prediction model to generate a delivery estimate (e.g., in Block S160). Parcel features preferably include conditioned parcel data (e.g., standardized parcel weight; carrier-provided delivery estimate converted into a standardized form used by a shipping services platform across a plurality of shipping carriers, etc.), but can additionally or alternatively include raw parcel data, parcel feature types analogous to types of delivery features (e.g., in Block S120), and/or any other suitable data. Parcel features preferably share at least a portion of feature types with the delivery features (e.g., generated in Block S120) used in generating a delivery prediction model, but can alternatively encompass feature types distinct from those typified by the delivery features.

Regarding Block S150, determining parcel features is preferably based on processing parcel data for one or more parcels according to a computer-implemented rule (e.g., a feature engineering rule, a user preference rule, etc.), but parcel features can be determined based on any suitable information. Computer-implemented rules applied in accordance with Block S120 are preferably the same computer-implemented rules applied in accordance with Block S150, such that Block S150 can include applying computer-implemented rules to determine parcel features in a manner analogous to applying the computer-implemented rules to determine delivery features. Meaningful comparisons between historical and current data (e.g., delivery data, parcel data, etc.) can be enabled by consistently applying the same computer-implemented rules to determining the delivery features used in generating the delivery prediction model, and to determining the parcel features used as input into the delivery prediction model. For example, the method 100 can include applying a feature engineering rule (e.g. a unit standardization rule) for converting origin and destination addresses for both historical deliveries (e.g., as specified in delivery data retrieved in Block S110) and current deliveries (e.g., specified by parcel data retrieved based on a tracking number in Block S150) into GPS coordinates, thereby standardizing the different formats used by different shipping carriers in describing origin and destination addresses. In another example, the method 100 can include applying the same feature engineering rule to convert historic carrier-provided delivery estimates and a parcel-specific carrier-provided delivery estimate into a shared unit type (e.g., number of minutes). Alternatively, Block S150 can include applying computer-implemented rules in a different manner (e.g., applying the same computer-implemented rules in different ways, applying different computer-implemented rules, etc.) than in Block S120. For example, if historical cross-carrier delivery data retrieved in Block S110 includes more types of data (e.g., address data, carrier-provided delivery estimates, and contextual data) than delivery-specific parcel data (e.g., address data and a carrier-provided delivery estimate, but no contextual data) retrieved in Block S140, different feature engineering rules can be applied to determine a larger feature set (e.g., from the historical cross-carrier delivery data) for generating the learning prediction model than for executing the delivery prediction model (e.g., with parcel features generated from the delivery-specific parcel dataset). In specific examples, privileged information machine learning models (e.g., SVM+, etc.) can be used in training delivery prediction models by leveraging additional types of information supplied by the historical delivery data than by parcel data (e.g., in situations where parcel data is associated with a shipping carrier providing fewer types of data than other shipping carriers, and historical delivery data from the other shipping carriers is used in generating a delivery prediction model). In another example, feature engineering rules applied to processing historical delivery data from a set of shipping carriers can differ from a feature engineering rule used in processing parcel data provided by a shipping carrier different from the set of shipping carriers (e.g., when using cross-carrier historical delivery data to predict a delivery estimate for a parcel shipped by a shipping carrier for which historical delivery data is unavailable). In another example, a feature engineering rule applied to process historical delivery data from a shipping carrier can be different from a feature engineering rule applied to process parcel data from the same shipping carrier (e.g., when the raw delivery data differs in format and/or data types than the parcel data; when the shipping carrier platform has updated the format for data stored by the shipping carrier platform; etc.). However, applying computer-implemented rules in relation to Block S150 can be performed in any suitable manner.

Block S150 is preferably performed in response to receiving parcel data (e.g., a threshold amount of parcel data; a threshold amount of parcel data types; updated parcel data received at a webhook endpoint; etc.) in Block S140, but can be performed in response to and/or concurrently with another trigger event (e.g., determining delivery features as in Block S120, etc.), at predetermined time intervals, and/or with any suitable temporal relationship to other portions of the method 100. For example, Block S150 can be performed each time a parcel data request (e.g., including a tracking number) is fulfilled (e.g., by a shipping carrier). Block S150 is preferably not repeated when the parcel data retrieved in Block S150 matches parcel data previously retrieved for the parcel (e.g., when there was no update in tracking data), but can repeated for any suitable purpose. However, Block S150 can be performed at any suitable time at any suitable frequency, and/or in any suitable manner.

3.6 Method—Determining a Delivery Estimate

Block S160 recites: determining a delivery estimate for the parcel based on processing the parcel features with the cross-carrier delivery prediction model. Block S160 functions to determine a delivery estimate for one or more parcels scheduled to be delivered or in the process of being delivered. Delivery estimates can include any one or more of: temporal parameters (e.g., delivery day, time, time window, amount of time until delivery, etc.), delivery-related data (e.g., confidence levels, type of parcels being delivered, probable parcel pick-up times, tracking status changes, mode of transportation, location of delivery vehicle, delivery vehicle analytics such as driver behavior, etc.) and/or any other suitable data. Determining a delivery estimate preferably is based on executing one or more delivery prediction models (e.g., generated in Block S130), but can additionally or alternatively be based on any suitable models and/or approaches. In an example, determining a delivery estimate can include applying an ensemble approach for using a plurality of delivery prediction models (e.g., predicting a plurality of delivery estimates with a plurality of delivery prediction models, and using the plurality of delivery estimates to predict a final delivery estimate with a final delivery prediction model, etc.). In another example, determining a delivery estimate can include predicting current contextual data with a contextual data prediction model, and using the predicted contextual data as features for a delivery prediction model. However, any suitable models can be combined and/or otherwise used to determine a delivery estimate.

Figure 3:
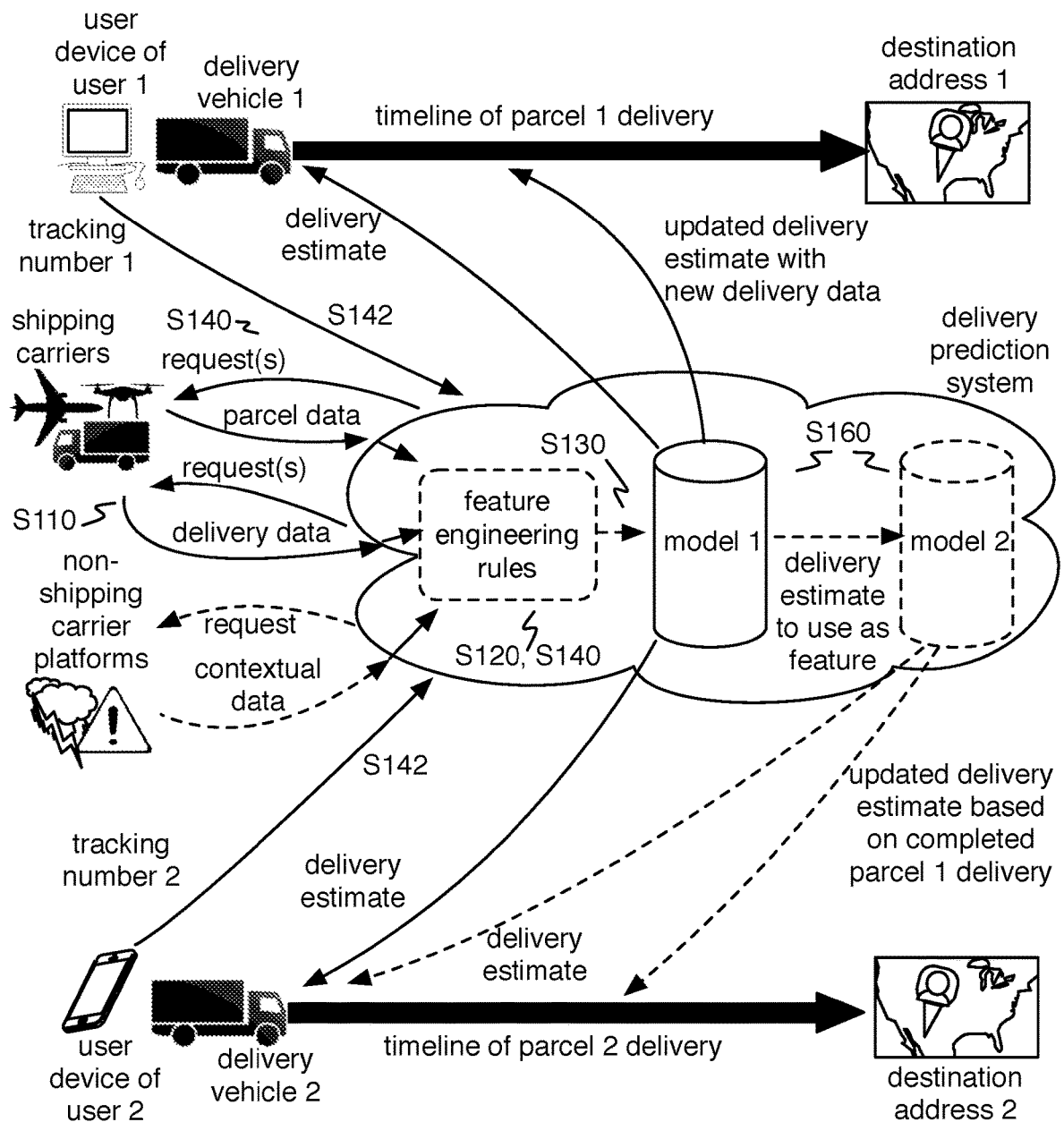
FIG. 3 is a schematic representation of delivery estimation for multiple users in variations of an embodiment of a method.

In a variation, as shown in FIG. 3, Block S160 can include determining a series (e.g., over time) of delivery estimates for a given parcel with a delivery prediction model. The series of delivery estimates can be determined with a delivery prediction model using a static set of delivery data and/or parcel data, with a delivery prediction model that is updated during the timeline of delivery with updated delivery data and/or updated parcel data (e.g., in response to sending delivery data requests and/or parcel data requests to shipping carriers during delivery), and/or with a delivery prediction model using any suitable data. In an example, Block S160 can include, during a delivery of a second parcel associated with a second user: determining an actual delivery time for a first parcel in response to completed delivery of the first parcel; updating a cross-carrier prediction model based on the actual delivery time; and determining a second delivery estimate for the second parcel (e.g., where the first deliver estimate was determined prior to the completed delivery of the first parcel) based on the updated cross-carrier delivery prediction model. In another example, the method 100 can include: determining a starting delivery estimate at the beginning of a delivery timeline for a parcel; detecting a delivery disruption trigger event (e.g., upon retrieving updated delivery data in Block S110; upon retrieving updated parcel data in Block S140; re-routing of the delivery vehicle; severe weather conditions; arrival of the parcel at a delivery checkpoint at a time different from an expected time beyond a threshold; unexpected traffic conditions; delivery vehicle technical difficulties; unexpectedly high amount of delivery volume generally, for specific locations, for specific shipping carriers, and/or along any suitable vector, which can lead to delivery delays; etc.); and in response to detecting a delivery disruption trigger event, determining an updated delivery estimate (e.g., using new inputs such as updated delivery data and/or parcel data with the delivery prediction model used for determining the starting delivery estimate; with an updated delivery prediction model; etc.). Detecting a delivery disruption trigger event and/or determining an updated delivery estimate for a first parcel can trigger delivery estimate updates for one or more other parcels. For example, delivery disruption trigger events pertinent to one parcel will likely have a disruptive effect on other related parcels (e.g., related with respect to delivery route data such as origin and/or destination addresses; with respect to sharing the same delivery vehicle; with respect to close location proximity at the time of the disruption; etc.). In a specific example, the method 100 can include determining an updated delivery estimate for a first parcel in response to detecting a delivery disruption trigger event (e.g., technical difficulties with a shipping carrier's fleet of a type of delivery vehicle; etc.) identifying a set of related parcels satisfying a relatedness condition (e.g., being shipped with a service level using the type of delivery vehicle); and determining updated delivery estimates for the set of related parcels. However, determining a series of delivery estimates can be performed in any suitable manner.

In another variation of Block S160, different types of delivery prediction models (e.g., generated in Block S130) can be used in determining one or more delivery estimates for one or more parcels. For example, the method 100 can include: retrieving, from a second carrier of a plurality of carriers, second parcel data for a second parcel based on a second tracking number associated with the second carrier; retrieving a second cross-carrier delivery prediction model based on the second parcel data, the second cross-carrier delivery prediction model using different cross-carrier delivery features than a first cross-carrier delivery prediction model used for a first parcel; and determining a second delivery estimate for the second parcel based on the second parcel data and the second cross-carrier delivery prediction model. In this variation, Block S160 can include selecting a delivery prediction model (e.g., from a set of generated delivery prediction models) to be used for determining a delivery estimate, such as based upon one or more of: delivery vehicle data (e.g. selecting a delivery prediction model generated from aircraft delivery vehicle-related features to predict a delivery estimate for a parcel being delivered by aircraft, etc.), location data (e.g., selecting delivery prediction models tailored to delivery routes between two particular countries, etc.), user data (e.g., selecting a delivery prediction model optimized for accuracy based on user preferences, etc.), criteria derived from delivery data and/or parcel data, and/or any other suitable criteria. In an example, Block S160 can include selecting a first cross-carrier delivery prediction model from a set of delivery prediction models based on a first destination address from first parcel data for a first parcel, and selecting a second cross-carrier delivery prediction model from the set of delivery prediction models based on a second destination address from second parcel data for a second parcel. In another example, as shown in FIG. 3, Block S160 can include switching, during the timeline of parcel delivery for a parcel, delivery prediction models such as based on criteria used in selecting a delivery prediction model. In a specific example, Block S160 can include for an inter-country delivery: determining a first delivery estimate with a first delivery prediction model in response to receiving parcel data specifying a parcel location in a first country; and determining a second delivery estimate with a second delivery prediction model in response to receiving updated parcel data specifying an updated parcel location in a second country. However, determining delivery estimates with different delivery prediction models can be performed in any suitable manner.

Block S160 is preferably performed in response to generating parcel features in Block S150, but can be performed in response to and/or concurrently with another trigger event (e.g., updating of a delivery prediction model, as shown in FIG. 3; receiving updated delivery data, as shown in FIG. 3; receiving a user request for a delivery estimate; receiving a tracking number in Block S142; receiving updated parcel data from a shipping carrier, such as at a webhook endpoint; etc.), at predetermined time intervals (e.g., daily), and/or with any suitable temporal relationship in relation to the method 100. In a variation, determining delivery estimates can be performed at a varying frequency based on the stage of delivery (e.g., predicting a delivery estimate once a day leading to the predicted date of delivery, and predicting delivery estimates every hour on the predicted date of delivery). Additionally or alternatively, the frequency of determining delivery estimates can be varied based on one or more of: a shipping carrier-specific basis (e.g. varying frequency of delivery estimation for different shipping carriers with patterns of updating parcel data for different shipping carriers), user-specific basis (e.g., greater frequency for enterprise users), service level-specific (e.g., greater frequency for Next Day Air service levels), location-specific (e.g., less frequency for interstate deliveries, for destination addresses within a particular zip code, etc.), and/or on any suitable basis. However, Block S160 can be performed at any suitable time at any suitable frequency with any suitable delivery prediction models.

Block S160 can additionally or alternatively include retrieving a delivery prediction model. Delivery prediction models and/or model identifiers can be stored in association with any suitable identifier (e.g., user identifiers identifying users for which a particular delivery prediction model is selected; location identifiers identifying locations for which a delivery prediction model is tailored; etc.) and/or any other suitable data. Block S160 can additionally or alternatively include generating confidence levels for the delivery estimates using any suitable algorithm. Generated confidence levels can be presented to and/or processed by a user, and/or used to inform timing and/or frequency of data retrieval (e.g., delivery data retrieval in Block S110, parcel data retrieval in Block S140, etc.), and/or for any other suitable purpose. For example, the method 100 can include: in response to generating a delivery estimate confidence level below a confidence level threshold, retrieving updated delivery data (e.g., in Block S110), updating the delivery prediction model with the updated delivery data; and generating an updated delivery estimate and confidence level (e.g., where these steps can be repeated until the confidence level threshold is exceeded). However, generating confidence levels can be performed in any suitable manner.

Block S160 can additionally or alternatively include ranking, selecting, and/or otherwise analyzing service levels (e.g., to be used for delivering the parcel in Block S174), such as based on: delivery estimate times (e.g., prioritizing service levels with fastest delivery time), other service level-related data (e.g., rate quotes, probability of successful delivery, associated shipping carrier, etc.), user preferences (e.g., filtering for service levels associated with a subset of shipping carriers, and ranking the filtered service levels based on delivery estimate times, etc.) and/or any other suitable criteria. Additionally or alternatively, selecting a service level can be performed in any manner analogous to that described in U.S. patent application Ser. No. 14/481,078, filed 9 Sep. 2014, and U.S. patent application Ser. No. 15/429,039, filed 9 Feb. 2017, the entireties of which are incorporated by this reference. Further, selecting a service level can be performed in any suitable manner. However, determining one or more delivery estimates S160 can be performed in any suitable manner.

3.7 Method—Responding to the Delivery Estimate.

Block S170 recites: responding to the delivery estimate. Block S170 functions to act on delivery predictions and/or enable a user and/or other third party to act on delivery predictions (e.g., in a manner suited to increasing efficiency for one or more of a shipping sender, a shipping receiver, and a shipping carrier). Block S170 can additionally or alternatively include: notifying a user with a delivery prediction notification S172; delivering the parcel based on a delivery estimate S174, generating an automated system command S176, and/or other suitable operations. Block S170 is preferably performed in response to determining a delivery estimate (e.g., in Block S160), but can be performed at any suitable time and/or frequency.

Block S170 can additionally or alternatively include notifying a user with a delivery prediction notification S172, which functions to notify one or more interested entities (e.g., a user associated with the parcel, such as a shipping sender, shipping recipient, shipping carrier, etc.). The delivery prediction notification preferably includes one or more delivery estimates for a parcel associated with the user recipient of the notification, but can additionally or alternatively include delivery data, delivery features, parcel data, parcel features, and/or any other suitable information. For example, Block S172 can include generating notifications that a parcel has not been delivered, as shown by a carrier tracking status. Delivery prediction notifications are preferably generated, transmitted, and provided to the intended recipient in substantially real-time, enabling rapid response to updated delivery predictions. Communication channels used in receiving and/or transmitting delivery prediction notifications preferably include a push notification service provided via the mobile electronic device (e.g., a native application operating on a shipping recipient smartphone), but can additionally or alternatively include: a short message system (SMS) network, email, instant message, an in-app notification system, web based websocket or publication-subscription channels, image based transmission of transaction information such as through QR-codes captured by a camera, and/or any other suitable communication channel.

In a variation, Block S172 can include transmitting a delivery prediction notification (e.g., an event occurrence indicating a change associated with delivery estimation, such as the determination of an updated delivery estimate) to activate an application (e.g., a third party web application, a third party mobile application, etc.) and/or other suitable component (e.g., user device) associated with a user. Any number of delivery prediction notifications (e.g., event occurrences) can be transmitted to any number of applications associated with any number of users. Activating one or more applications preferably includes causing the application to process the delivery prediction notification (e.g., analyze a delivery estimate provided by the delivery prediction notification) and respond accordingly (e.g., integrate the delivery estimate into a shipping logistics system). In this variation, Block S172 can include enabling a user to establish webhook endpoints to which delivery prediction notifications (e.g., event occurrences) can be automatically transmitted in response to a trigger event. Webhook endpoints are preferably webhook endpoint URLs, and delivery prediction notifications to the webhook endpoints are preferably HTTP POST requests, but webhook endpoints and associated delivery prediction notifications can typify any suitable format. In an example, the method 100 can include leveraging webhooks to automate delivery prediction notification in real-time (e.g., immediately in response to a shipping carrier updating parcel data for a tracking number). In a specific example, the method 100 can include receiving, at a shipping services platform webhook endpoint, updated parcel data in response to a shipping carrier updating the tracking data for the parcel; determining a delivery estimate in response to receiving the updated parcel data; and transmitting an event occurrence (e.g., including the delivery estimate) to a user-established webhook endpoint (e.g., to activate an application associated with the user). In another specific example, the method 100 can include: receiving a webhook endpoint address from a user; associating the webhook endpoint address with a user identifier identifying the user, and automatically pushing a first event occurrence (e.g., including a first delivery estimate) to the webhook endpoint address for processing by the first application. In this specific example, the method 100 can further include: determining a second delivery estimate (e.g., based on processing updated parcel features for the parcel) with the cross-carrier delivery prediction model; and automatically pushing a second event occurrence to the webhook endpoint address in response to the second delivery estimate differing from the first delivery estimate beyond a delivery estimate threshold. However, transmitting a delivery prediction notification to activate an application can be performed in any suitable manner.

Block S172 preferably includes transmitting the delivery prediction notification to a user, but can additionally or alliteratively be transmitted to any suitable party. For example, Block S172 can include sending a notification to a neighbor that a package has arrived if the shipping recipient is not home (e.g., or in response to a request or indication from the shipping recipient to do so). Block S172 is preferably performed in response to a delivery estimate request (e.g., received via a shipping services platform API, where the delivery prediction notification is transmitted in response through the shipping services platform API; received through a web application; received through e-mail; etc.), but can additionally be performed at any time suitable time at any suitable frequency. In a variation, notification parameters of Block S172 (e.g., frequency of notification, etc.) can be mediated by confidence levels generated in Block S160. For example, Block S172 can provide delivery prediction notifications in response to associated delivery estimates having confidence levels exceeding a threshold confidence level. In another variation, notification parameters can be mediated by differences between past and current delivery estimates for a given parcel. For example, if predicted delivery estimate time changes by five minutes, generation of a new delivery prediction notification can be omitted, but a difference between a previous and a current delivery estimate exceeding a threshold can trigger Block S172. In another variation, notification parameters can be mediated by time differences between predicted delivery estimates and a current time. For example, updates to the delivery estimate on the day of delivery can be more crucial than updates to the delivery estimates several days before delivery. Changes in delivery estimates and time-left-to-delivery can additionally or alternatively be combined (e.g., new notifications can be generated only if the shift in delivery estimates is greater than five percent of the time remaining before predicted delivery). However, notifying a user S172 can be performed in any suitable manner.

Block S170 can additionally or alternatively include delivering the parcel based on one or more delivery estimates S174, which functions facilitate and/or improve delivery of the parcel by leveraging predicted delivery estimates (e.g., in Block S160). Delivering a parcel is preferably according to a service level determined in Block S160 based on one or more predicted delivery estimates for the service levels. For example, the method 100 can include: generating service level features (e.g., mode of transportation, described delivery estimate time such as Next Day or 2nd Day, rate quote, weight requirements, dimensions requirements, object type requirements, etc.) for service levels (e.g., provided by a first party shipping carrier, which can be associated with a shipping services platform); determining a plurality of delivery estimates for the service levels based on processing one or more delivery prediction models with the service level features (e.g., along with parcel features for the parcel being delivered); and delivering the parcel according to a service level selected from the service levels (e.g., in Block S160) based on the plurality of delivery estimates.

Regarding Block S174, the one or more parcels are preferably delivered with a delivery vehicle specified in relation to the system 200, but can additionally or alternatively be delivered by any suitable component. In an example, the method 100 can include generating (e.g., at a remote delivery prediction system) control instructions for a delivery drone (e.g., in Block S176) in response to selection of the drone delivery service from the service levels (e.g., based on corresponding delivery estimates); and controlling the delivery drone to deliver the parcel based on the control instructions. In this example, for generating the delivery prediction model used in determining the delivery estimates, the method 100 can include: retrieving historical delivery data including drone delivery data for historical completed drone deliveries completed by a plurality of third party shipping carriers; generating cross-carrier delivery features including drone delivery features generated based on combining the drone delivery data; and generating the delivery prediction model based on the drone delivery features. In a variation, delivering the parcel can include rerouting delivery of the parcel based on one or more delivery estimates. For example, Block S174 can include: re-querying a plurality of third party shipping carriers for updated delivery data; determining an updated delivery estimate for the service level (e.g., used to delivery the parcel) based on the updated delivery data; and rerouting delivery of the parcel based on the updated delivery estimate. Block S174 is preferably performed in response to selecting a service level based on a delivery estimate, but can be performed in response to and/or concurrently with another trigger event (e.g., determining a batch of parcels to ship together; receiving payment for a service level from a user such as through the API; etc.), at a predetermined time interval, and/or at any suitable time at any suitable frequency. However, delivering the parcel S174 can be performed in any suitable manner.

Block S170 can additionally or alternatively include generating an automated system command S176, which functions to generate control instructions for commanding autonomous systems (e.g., associated with and/or dependent directly or indirectly on parcel delivery and delivery estimates) to perform one or more actions in response to a predicted delivery estimate. In an example, Block S176 can include generating control instructions for an autonomous delivery vehicle (e.g., autonomous automobile, autonomous delivery drone), such as in response to selecting a service level for delivering the parcel based on a delivery estimate. In another example, Block S176 can include automatically unlocking an automated entry gate, turning on exterior lights, etc. prior to a predicted delivery estimate. In another example, Block S176 can include activating refrigerators some time before arrival of a refrigerated shipment (which can enable a refrigerator to not need to be run constantly, reducing energy usage). However, Block S176 can be performed in any suitable manner.

3.8 Method—Generating Tracking-Related Data Structures.

Figure 4:
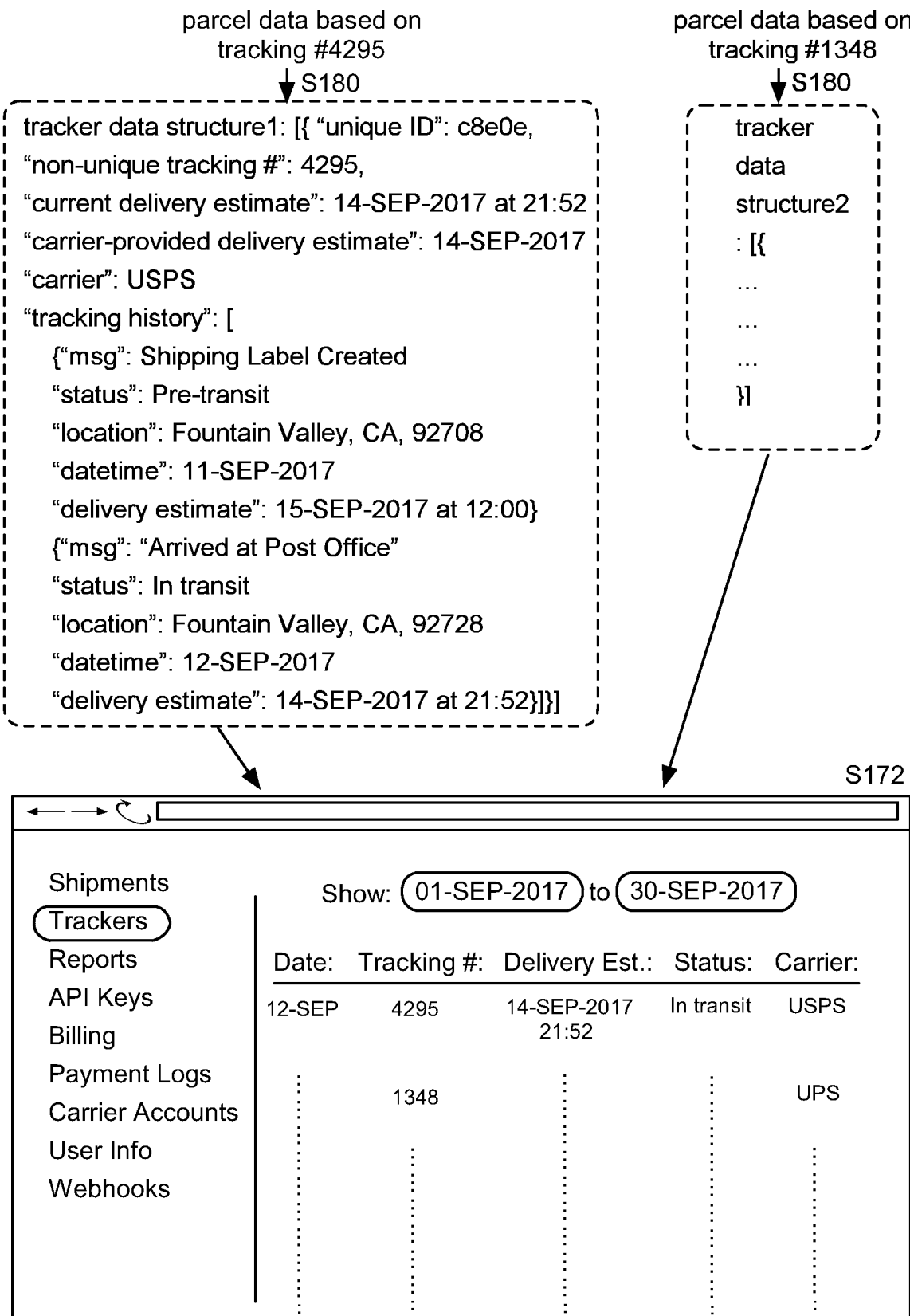
FIG. 4 is a schematic representation of tracker data structures in a variation of an embodiment of a method.

As shown in FIGS. 2 and 4, the method 100 can additionally or alternatively include generating tracking-related data structures S180, which functions to generate data structures for use in processing system-based delivery prediction system, in an API, and/or other suitable interface for predicting delivery estimates and/or performing other suitable portions of the method 100. Tracking-related data structures can include any one or more of: tracker data structures (e.g., tracker object data structures specifying delivery estimates and associated data for a parcel, etc.), parcel data structures (e.g., representing one or more parcels to be shipped), shipment data structures (e.g., representing a shipment operation), user preferences, computer-implemented rules, delivery data, delivery features, parcel data, parcel features, identifiers identifying one or more tangible entities (e.g., parcels, users, user devices, delivery vehicles, etc.) or intangible entities (e.g., trackers, shipments, delivery data, parcel data etc.), and/or any other suitable data structure.

Regarding Block S180, as shown in FIG. 4, any number of tracker-related data structures can be generated, used, and/or otherwise manipulated. For example, different tracker data structures can be generated for tracking parcels delivered across a plurality of shipping carriers (e.g., and associated service levels), where computer-implemented rules for generating, formatting, and/or using a tracker data structure type can be consistent or different across different shipping carriers. In another example, as shown in FIG. 4, the method 100 can enable a user to retrieve delivery estimates for a plurality of parcels being delivered by a plurality of shipping carriers. In a specific example, the method 100 can include generating a first and a second tracker data structure, each including a unique identifier and parcel features (e.g., generated based on respective parcel data), where the first and the second tracker data structures are associated with parcels being delivered by different shipping carriers; and in response to receiving a request from the user for tracking data associated with the first and the second parcels, retrieving the first and the second tracker data structures based on the first unique identifier and the second unique identifier (e.g., in order to retrieve delivery estimates for the parcels to present to the user). In another example, tracker-related data structures can be used in batching data requests (e.g., delivery data requests, parcel data requests, etc.) and/or other suitable requests into a single combined request and/or other suitable form for improving efficiency of data retrieval. In a specific example, the method 100 can include: receiving a first tracking number provided by a first shipping carrier (e.g., for a first parcel associated with a first user); receiving a second tracking number provided by the first shipping carrier (e.g., for a second parcel associated with a second user); and batching the first and the second non unique-tracking numbers into a parcel data API request tailored to the shipping carrier.

Block S180 is preferably performed in response to and/or concurrently with trigger events (e.g., receiving parcel data; receiving delivery data; receiving a tracking number; etc.), but can additionally or alternatively be performed at predetermined time intervals, and/or at any suitable time and/or frequency. In a variation, Block S180 can include generating a tracker data structure in response to receiving a tracking number (e.g., from a user through an API). Generating the tracker data structure preferably includes a generating a unique tracker identifier for the tracking number (e.g., which can be non-unique across shipping carriers), but can include generating any suitable information for the tracker data structure. In an example, the method 100 can include: in response to generating the parcel features, automatically generating a tracker data structure including a unique tracker identifier and the parcel features; and determining a delivery estimate based on retrieving the parcel features from the tracker data structure. In another variation, Block S180 can include updating tracker data structures (e.g., appending updated parcel data to a tracker data structure). In an example, the method 100 can include: retrieving updated parcel data for the parcel based on the non-unique tracking number; generating updated parcel features for the parcel based on the updated parcel data; updating the tracker data structure with the updated parcel features; and determining a second delivery estimate for the parcel based on processing past parcel features (e.g., used in determining a first delivery estimate) and the updated parcel features with the cross-carrier delivery prediction model, where determining the second delivery estimate includes retrieving the past parcel features and the updated parcel features from the tracker data structure. However, Block S180 can be performed in any suitable manner.

Any portions of the method 100 can be performed in serial (e.g., in response to, etc.), parallel (e.g., concurrently on different threads for parallel computing to improve system processing for determining delivery estimates, etc.), and/or with any suitable temporal relationship. However, the method 100 and/or portions of the method 100 can be performed in any suitable manner.

4. System.

The system 200 preferably includes a delivery prediction system operable to determine delivery estimates for one or more parcels. Additionally or alternatively, the system 200 can include one or more of a: delivery vehicle, object dimensions measurer, object weight measurer, label printer system, and/or any other suitable component. The method 100 and/or portions of the method 100 are preferably implemented by the delivery prediction system (e.g., a remote computing system operated by a shipping services platform, which can also function as a first party shipping carrier, etc.), but can additionally or alternatively be implemented by one or more: of remote computing systems (e.g., a server, at least one networked computing system, stateless, stateful), local computing systems, shipping carriers (e.g., shipping carrier platforms), non-shipping carrier platforms, user devices, databases (e.g., delivery data databases, parcel data databases, etc.), and/or by any suitable component. Communication by and/or between any components of the system can include wireless communication (e.g., WiFi, Bluetooth, radiofrequency, etc.) and/or wired communication. In variations, the system 200 can include any suitable components and/or perform any suitable functionality analogous to that described in U.S. patent application Ser. No. 14/481,078, filed 9 Sep. 2014, and U.S. patent application Ser. No. 15/429,039, filed 9 Feb. 2017, the entireties of which are incorporated by this reference. However, the system 200 and/or other components of the system 200 can be configured in any suitable manner.

An alternative embodiment preferably implements the above methods in a computer-readable medium storing computer-readable instructions. The instructions are preferably executed by computer-executable components preferably integrated with a shipping services platform. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

The embodiments include every combination and permutation of the various system components and the various method processes, including any variations, examples, and specific examples.

As a person skilled in the art will recognize from the previous detailed description and from the figures and claims, modifications and changes can be made to the preferred embodiments of the invention without departing from the scope of this invention defined in the following claims.

I claim:

1. A method for improving parcel delivery, the method comprising:
generating a first and a second cross-carrier delivery prediction model based on delivery data retrieved from a plurality of carriers;
at a delivery data database of a server system, storing a plurality of cross-carrier delivery models comprising the first and the second cross-carrier delivery prediction model, the first cross-carrier delivery prediction model stored in association with a first carrier identifier and the second cross-carrier delivery prediction model stored in association with a second carrier identifier, for improving upon data storage and retrieval functionality to enable substantially real-time analysis of cross-carrier data to determine delivery estimates of improved accuracy;
determining a first parcel delivery estimate for a first parcel based on processing first parcel data, from a first carrier of the plurality of carriers, with the first cross-carrier delivery prediction model retrieved from the delivery data database;
automatically determining a second parcel delivery estimate for a second parcel based on a first parcel delivery status and upon retrieving, from a second carrier of the plurality of carriers, second parcel data, wherein determining the second parcel delivery estimate comprises:
transmitting a first API request to the second carrier associated with the second parcel;
establishing a webhook endpoint Uniform Resource Locator (URL) for receiving communication from the first carrier associated with the first parcel;
at the webhook endpoint Uniform Resource Locator (URL) associated with the first carrier, receiving a request from the first carrier in response to the first carrier updating the first parcel delivery status;
in response to receiving the request at the webhook endpoint URL associated with the first carrier, automatically transmitting a second API request to the second carrier to obtain updated second parcel data; and
outputting the second parcel delivery estimate upon retrieving the second cross-carrier delivery prediction model from the delivery data database and processing updated second parcel features with the second cross-carrier delivery prediction model in substantially real-time, as facilitated by the improved data storage and retrieval functionality at the remote server system; and
in response to determining the second parcel delivery estimate, automatically selecting a service level for delivering the second parcel;
generating, at a remote delivery system, a set of control instructions; and
executing the delivery of the second parcel based on the selected service level and the set of control instructions;
wherein retrieving at least one of first parcel data or second parcel data is based on processing a tracking number associated with at least one of the first parcel or the second parcel, comprising:
automatically identifying a carrier associated with the tracking number, wherein automatically identifying the carrier associated with the tracking number comprises:
determining an alphanumeric pattern;
pattern matching the alphanumeric pattern to patterns used by different carriers;
parsing the given tracking number for characters indicative of the carrier; and
parsing the tracking number into features and executing a machine learning algorithm with the features to identify the carrier from the plurality of carriers; and
generating an API request for at least one of first parcel data or second parcel data tailored to the carrier in response to identifying the carrier.

2. The method of claim 1, further comprising:
for the first parcel, retrieving, from a carrier associated with the first parcel, first parcel data and first delivery data;
generating first parcel features from first parcel data and first delivery features from first delivery data; and
determining the first parcel delivery estimate based on processing at least one of first parcel features or first delivery features with the first cross-carrier delivery prediction model; and
for the second parcel, retrieving, from a carrier associated with the second parcel, second parcel data and second delivery data;
generating second parcel features from second parcel data and second delivery features from second delivery data; and
determining the second parcel delivery estimate based on processing at least one of second parcel features or second delivery features with the second cross-carrier delivery prediction model.

3. The method of claim 2, wherein generating at least one of first delivery features or second delivery features for the first parcel further comprises:
according to a feature engineering rule, processing at least one of first delivery data or second delivery data, and standardizing historic carrier-provided delivery estimates; wherein the feature engineering rule is a unit standardization rule, and wherein at least one of first delivery features or second delivery features comprise at least one of origin address, destination address, handling times, transit times, delivery route information, delivery vehicle information, or delivery status information.

4. The method of claim 2, wherein generating at least one of first parcel features or second parcel features for the second parcel further comprises:
according to a feature engineering rule, processing at least one of first parcel data or second parcel data, and standardizing historic carrier-provided delivery estimates; wherein the feature engineering rule is a unit standardization rule, and wherein at least one of first parcel features or second parcel features comprise at least one of parcel size, parcel weight, current parcel location, current parcel delivery route, parcel content information, or delivery status information.

5. The method of claim 1, further comprising:
during the delivery of the second parcel, and in response to determining a second parcel delivery status, automatically updating the second cross-carrier delivery prediction model; wherein determining the second parcel delivery status comprises detecting a trigger event and generating an updated second parcel delivery estimate based upon the trigger event, the trigger event comprising at least one of: a delivery disruption during the delivery of the second parcel, a predetermined time during the delivery of the second parcel, or a user query.

6. The method of claim 1, further comprising:
in response to an updated second parcel delivery estimate, switching the second cross-carrier delivery prediction model to an updated second cross-carrier delivery prediction model, wherein switching to the updated second cross-carrier delivery prediction model comprises:
determining selection criteria of the updated second cross-carrier delivery prediction model based on at least one of updated second delivery data, updated second parcel data, or the updated second parcel delivery estimate;
selecting the updated second cross-carrier delivery prediction model from the plurality of cross-carrier delivery prediction models stored in the delivery data database; and
switching the second cross-carrier delivery prediction model to the updated second cross-carrier delivery prediction model based on selection criteria.

7. The method of claim 1, wherein selecting the service level comprises:
generating second parcel service level features for service levels provided by the second carrier associated with the second parcel;
generating a plurality of delivery estimates corresponding to service levels upon processing the second parcel service level features with the second cross-carrier delivery prediction model; and
selecting the service level corresponding to a desired delivery estimate from the plurality of delivery estimates; wherein the second parcel service level features are based on at least one of delivery features, parcel features, user features, supplementary features, or cross-carrier delivery prediction models retrieved from the delivery data database associated with the second parcel, and comprise at least one of mode of transportation, desired delivery time, rate quote, weight requirements, or dimension requirements.

8. The method of claim 1, wherein execution of the delivery of the second parcel further comprises:
controlling a delivery vehicle to deliver the second parcel based on the selected service level and the set of control instructions, and wherein the delivery vehicle is an autonomous system operated by a third party carrier, the third party carrier associated with a cross-carrier delivery model stored in the database.

9. A method for improving parcel delivery, the method comprising:
generating a first and a second cross-carrier delivery prediction model based on delivery data retrieved from a plurality of carriers;
at a delivery data database of a server system, storing a plurality of cross-carrier delivery models comprising the first and the second cross-carrier delivery prediction model, the first cross-carrier delivery prediction model stored in association with a first carrier identifier and the second cross-carrier delivery prediction model stored in association with a second carrier identifier, for improving upon data storage and retrieval functionality to enable substantially real-time analysis of cross-carrier data to determine delivery estimates of improved accuracy;
determining a first parcel delivery estimate for a first parcel based on processing first parcel data, from a first carrier of the plurality of carriers, with the first cross-carrier delivery prediction model retrieved from the delivery data database; and
automatically determining a second parcel delivery estimate for a second parcel based on a first parcel delivery status and upon retrieving, from a second carrier of the plurality of carriers, second parcel data, wherein determining the second parcel delivery estimate comprises:
transmitting a first API request to the second carrier associated with the second parcel;
establishing a webhook endpoint Uniform Resource Locator (URL) for receiving communication from the first carrier associated with the first parcel;
at the webhook endpoint Uniform Resource Locator (URL) associated with the first carrier, receiving a request from the first carrier in response to the first carrier updating the first parcel delivery status;
in response to receiving the request at the webhook endpoint URL associated with the first carrier, automatically transmitting a second API request to the second carrier to obtain updated second parcel data; and
outputting the second parcel delivery estimate upon retrieving the second cross-carrier delivery prediction model from the delivery data database and processing updated second parcel features with the second cross-carrier delivery prediction model in substantially real-time, as facilitated by the improved data storage and retrieval functionality at the remote server system;
wherein retrieving at least one of first parcel data or second parcel data is based on automatically identifying a carrier associated with a tracking number, the tracking number associated with at least one of the first parcel or the second parcel, comprising:
determining an alphanumeric pattern;
pattern matching the alphanumeric pattern to patterns used by different carriers;
parsing the given tracking number for characters indicative of the carrier;
parsing the tracking number into features and executing a machine learning algorithm with the features to identify the carrier from the plurality of carriers; and
generating an API request for at least one of first parcel data or second parcel data tailored to the carrier in response to automatically identifying the carrier.

10. The method of claim 9, further comprising:
for the first parcel, retrieving, from a carrier associated with the first parcel, first parcel data and first delivery data;
generating first parcel features from first parcel data and first delivery features from first delivery data; and
determining the first parcel delivery estimate based on processing at least one of first parcel features or first delivery features with the first cross-carrier delivery prediction model; and
for the second parcel, retrieving, from a carrier associated with the second parcel, second parcel data and second delivery data;
generating second parcel features from second parcel data and second delivery features from second delivery data; and
determining the second parcel delivery estimate based on processing at least one of second parcel features and second delivery features with the second cross-carrier delivery prediction model.

11. The method of claim 10, wherein generating at least one of parcel features and delivery features for at least one of the first parcel and the second parcel further comprises:

according to a feature engineering rule, processing at least one of parcel data or delivery data, and standardizing historic carrier-provided delivery estimates for at least one of the first parcel or the second parcel; wherein the feature engineering rule is a unit standardization rule, and wherein parcel features comprise at least one of parcel size, parcel weight, current parcel location, current parcel delivery route, parcel content information, or delivery status information; and wherein delivery features comprise at least one of origin address, destination address, handling times, transit times, delivery route information, delivery vehicle information, or delivery status information.

12. The method of claim 9, further comprising executing of the delivery of the second parcel, comprising:

controlling a delivery vehicle to deliver the second parcel based on a selected service level and a set of control instructions, and wherein the delivery vehicle is an autonomous system operated by a third party carrier, the third party carrier associated with a cross-carrier delivery model stored in the database.

13. The method of claim 12, wherein the autonomous system is a drone, and the third party carrier is a drone delivery service.

14. The method of claim 9, further comprising selecting a service level, comprising:

generating second parcel service level features for service levels provided by the second carrier associated with the second parcel;

generating a plurality of delivery estimates corresponding to service levels upon processing the second parcel service level features with the second cross-carrier delivery prediction model; and selecting the service level corresponding to a desired delivery estimate from the plurality of delivery estimates; wherein the second parcel service level features are based on at least one of delivery features, parcel features, user features, supplementary features, or cross-carrier delivery prediction models retrieved from the delivery data database associated with the second parcel, and comprise at least one of mode of transportation, desired delivery time, rate quote, weight requirements, or dimension requirements.

15. The method of claim 9, further comprising:

during the delivery of the second parcel, and in response to determining a second parcel delivery status, performing at least one of: automatically updating the second cross-carrier delivery prediction model or switching the second cross-carrier delivery prediction model to an updated second cross-carrier delivery prediction model; wherein determining the second parcel delivery status comprises:

detecting a trigger event and generating an updated second parcel delivery estimate based on the trigger event, the trigger event comprising at least one of: a delivery disruption during the delivery of the second parcel, a predetermined time during the delivery of the second parcel, or a user query.

16. The method of claim 9, further comprising:

identifying a set of related parcels satisfying a relatedness condition associated with the second parcel; and determining a set of delivery estimates for the set of related parcels based on a second parcel delivery status, wherein the relatedness condition associated with the second parcel comprises being delivered with a similar selected service level as the second parcel.

* * * * *